UNITED STATES PATENT OFFICE.

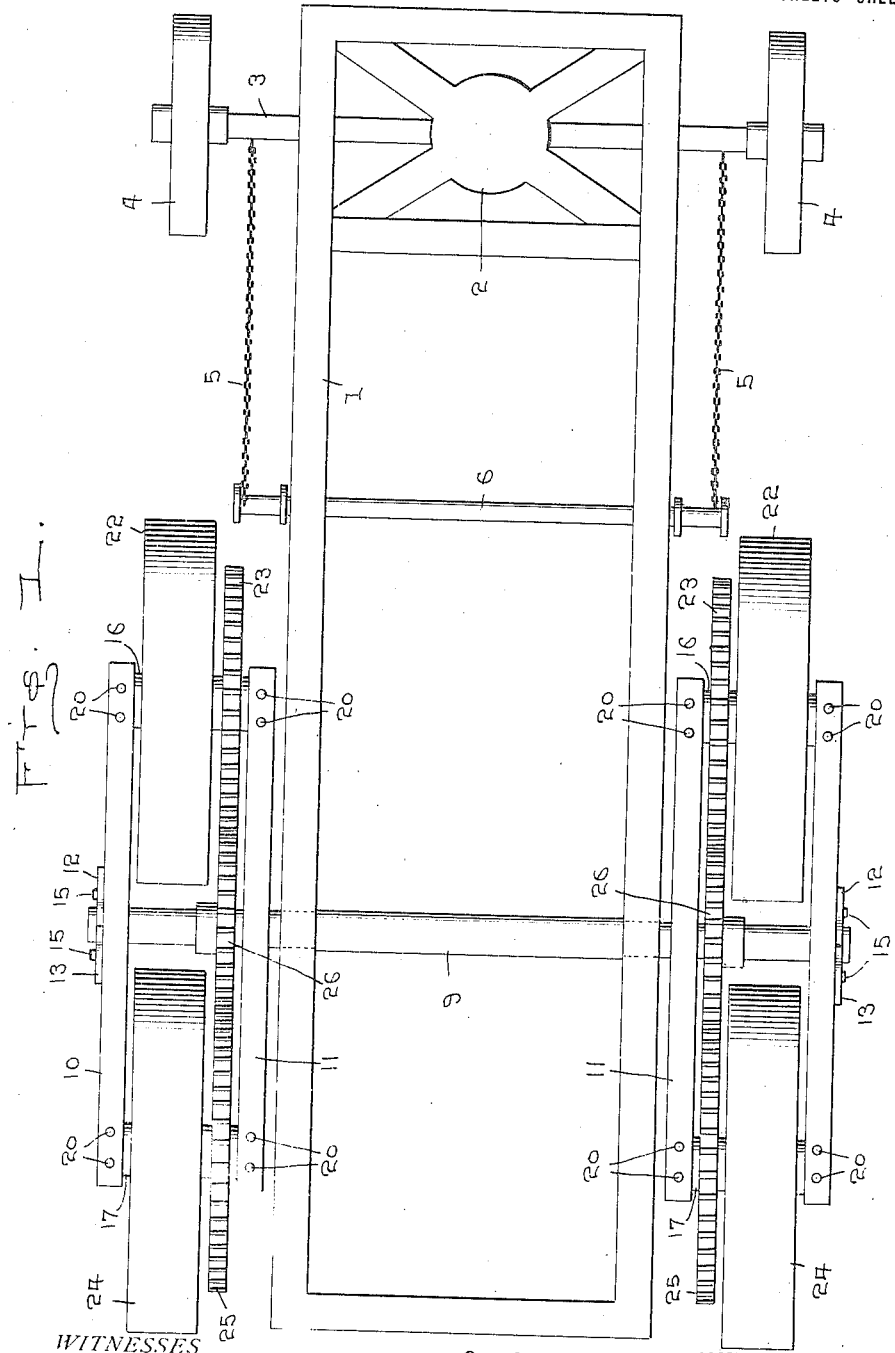

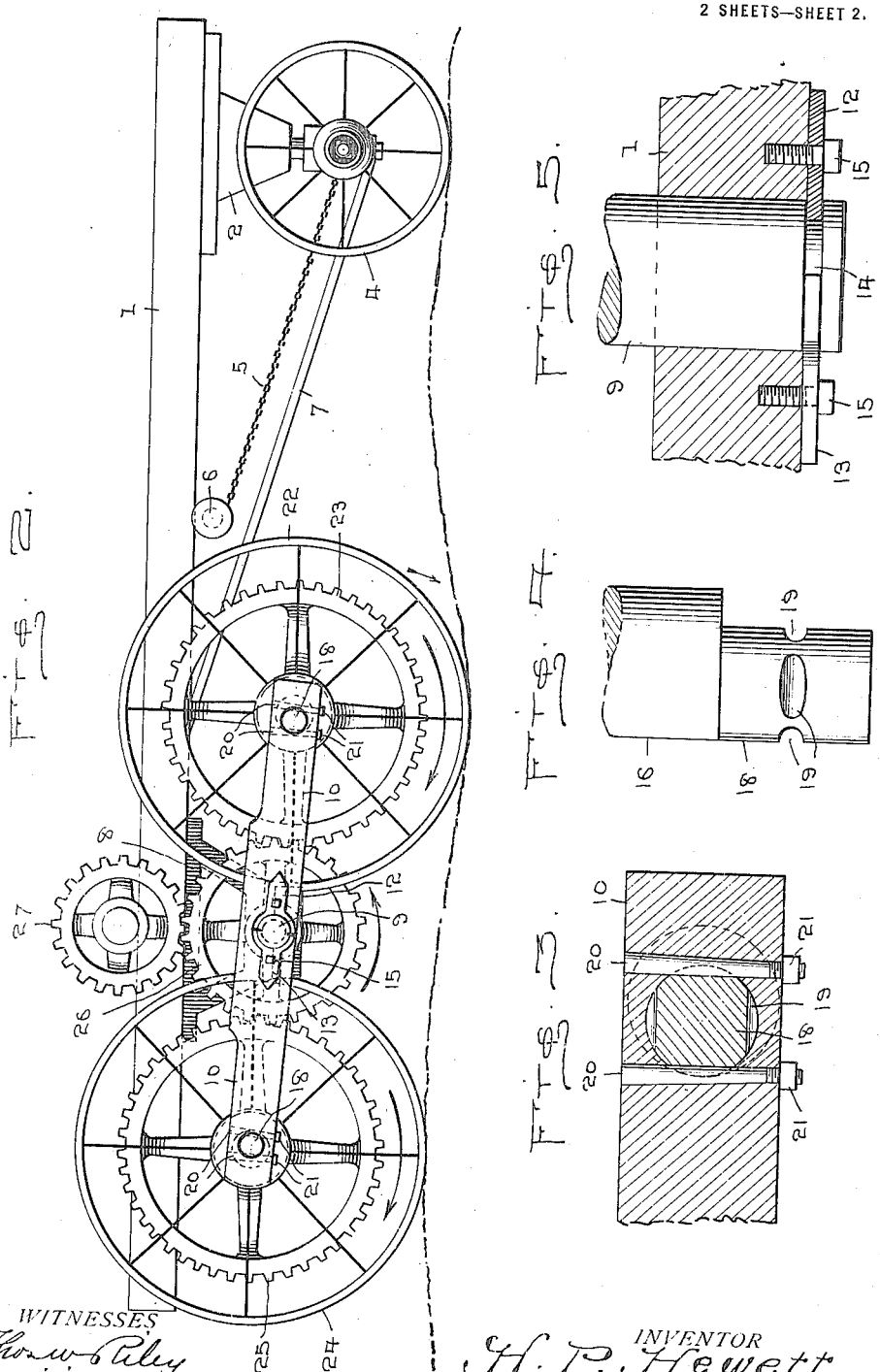

HENRY P. HEWETT, OF SPOKANE, WASHINGTON.

POWER TRANSMISSION.

1,145,893. Specification of Letters Patent. Patented July 13, 1915.

Application filed April 7, 1914. Serial No. 830,179.

*To all whom it may concern:*

Be it known that I, HENRY P. HEWETT, a citizen of the United States, residing at Spokane, in the county of Spokane and State of Washington, have invented certain new and useful Improvements in Power Transmission; and I do hereby declare the following to be a full, clear, and exact description of the invention, such as will enable others skilled in the art to which it appertains to make and use the same.

This invention relates to power transmission and more particularly to power transmission to be applied to tractors or other motor vehicles, and has for one of its objects the construction of oscillating frames in each of which is mounted a pair of driving wheels whereby the same may be in constant contact with the ground thus maintaining the stability of the structure when traveling over uneven surface.

A further object of this invention resides in the means of centrally mounting the driving mechanism whereby the tendency is in a downward direction upon the forward end of the tractor thereby maintaining the steering wheels firmly upon the surface of the ground thus providing a more accurate steering of the tractor or other machines.

A further object of this invention resides in the provision of means for adjusting the traction wheels relative to each other within the frame for preventing lost motion occasioned by the wear upon the gearing for transmitting power to the same.

A still further object of this invention resides in the construction of power transmission for tractors or other vehicles comprising few parts, durable, efficient in purpose and which may be manufactured at a nominal cost.

These and other objects will more fully appear and the nature of the invention be more clearly understood by the construction, combination and arrangement of parts thereof as described in the following specification, defined in the appended claims and illustrated in the accompanying drawings, in which, Figure 1 is a top plan view of the tractor showing the mounting of the traction wheels within the oscillating frames. Fig. 2 is a side elevation of the same showing the driving gear interposed between one of the pairs of traction wheels. Fig. 3 is a vertical sectional view of one of the ends of the oscillating frames showing the means of mounting therein the eccentric shafts upon which the traction wheels are designed to revolve. Fig. 4 is a view of one of the ends of the eccentric shafts, partly broken away, showing the means for retaining the same in several adjusted positions. Fig. 5 is a longitudinal sectional view of the central portion of one of the sides of the oscillating frame showing the manner of mounting the main axle within the auxiliary frames, the axle being shown partly broken away.

Referring to the drawings 1 denotes the frame of the tractor provided at the forward end thereof with the swivel support 2 supported by the front axle 3 at the outer ends of which are the usual steering wheels 4 operated by the chain or other connections 5, connected to any suitable form of steering mechanism for operating the steering shaft 6, the forward axle support of the tractor being braced in any suitable manner as shown by the brace rods 7.

Suitably mounted at the under sides of the side rails 1 of the machine are the brackets 8 having suitable journal boxings formed at the lower ends thereof and in which is mounted the driving shaft 9, the ends of the axle 9 projecting beyond the sides of the frame 1 having mounted upon each end thereof the oscillating frames comprising the outer bar 10 and the inner bar 11 in parallelism with each other, each of the bars 10 and 11 being provided centrally thereof with any suitable form of journals in which the ends of the driving shaft 9 are mounted, the shaft 9 being retained within the oscillating frame by the semi-circular keys 12 and 13 for engaging the annular groove 14 arranged adjacent the ends of the driving shaft 9, the semi-circular keys being retained upon the bar 10 of the oscillating frames by the bolts 15 or other suitable securing means.

Arranged at the forward and rearward ends of the oscillating frames are the eccentrically mounted bearing shafts 16 and 17 respectively, each of the ends of the bearing shafts being provided with the eccentrically arranged stub shafts 18, each of which is provided with the pairs of parallel oppositely disposed grooves 19, the grooves 19 being disposed relative to each other at an angle of approximately 90 degrees around the circumference of the stub shafts 18. The stub shafts 18 of each of the shafts 16 and 17 are suitably mounted in apertures formed in each of the bars of the oscillating frames and retained therein in fixed adjusted position by the tapered locking pins 20 designed to pass through vertical apertures of the same contour in such manner that the tapered locking pins 20 engage the grooves 19 at opposite sides of the eccentrically mounted stub shafts 18.

Upon the shafts 16 at each of the ends of the oscillating frames and within the same are mounted the forward traction wheels 22 upon the shafts 16 and upon the shafts 17 at the rear of the oscillating frames are mounted the rear traction wheels 24, each of the traction wheels being provided at the inner side thereof and secured thereto in any suitable manner with the spur gears 23 upon the traction wheels 22 and the spur gears 25 upon the inner side of the traction wheels 24.

Suitably mounted upon the driving shaft 9 and within the oscillating frames are the driving spur gears 26 interposed between the spur gears 23 and 25 of the respective traction wheels 22 and 24 in longitudinal alinement therewith and meshing with the respective gears 23 and 25, the gear 26 being driven by the gear 27, which latter gear may be driven by any suitable power mechanism arranged upon the tractor or other motor vehicle.

It is to be understood that in the construction of my power transmission for tractors or other motor vehicles, I have thus overcome the serious objections attending tractors having only one traction wheel at each side thereof whereby the tendency of the power exerted upon the same is to raise the forward end of the tractor from the ground thus causing the steering wheels to be more or less inefficient, wherein the construction of my invention thus wholly eliminates these objections, as the tendency of the power exerted upon the traction wheels is in a downward direction thereby maintaining the steering wheels at the forward part of the tractor firmly in contact with the ground. Another feature of my invention is that the oscillating frame in which the traction wheels are mounted at each side of the tractor equalizes for all unevenness of the surface over which it travels thus maintaining the stability of the tractor or other vehicle. Another feature resides in maintaining the traction wheels upon eccentrically mounted shafts capable of adjustment whereby the traction wheels may be adjusted relative to each other and the driving gearing for taking up the lost motion occasioned by wear of these parts. These features are regarded as very material improvements of structures in the art to which this invention appertains.

While I have here shown and described the preferred embodiment of my invention I hereby reserve the right to make such alterations and variations therein from time to time as I may deem expedient, and which will neither depart from the spirit of this invention nor conflict with the scope of the claims.

Having thus fully described my invention, what I claim as new and desire to secure by Letters-Patent of the United States is:

1. In a power transmission for tractors or other motor vehicles, the combination with the frame and the driving shaft thereof, of a pair of oscillating frames, said frames being mounted upon the ends of the said driving shaft and comprising a pair of rectangular bars; a pair of bearing shafts having eccentrically positioned extensions on the ends thereof; means for adjustably securing said bearing shafts within apertures adjacent the ends of said bars; means for rotatably securing the said driving shaft to said oscillating frame; and a pair of traction wheels rotatably mounted upon said bearing shafts, between each pair of bars of the said oscillating frames, each bearing shaft carrying a spur gear, which is in alinement with a spur gear wheel positioned upon said driving shaft, the cogs on the said spur gear and the said spur gear wheel enmeshing, the said spur gear wheel on the said driving shaft being driven by a gear wheel located above the frame of the vehicle.

2. In a power transmission for tractors or other motor vehicles, the combination with the frame and driving shaft thereof, of a pair of oscillating frames rotatably mounted on the ends of said driving shaft, each frame comprising a pair of rectangular bars; a pair of bearing shafts having eccentrically positioned extensions on the ends thereof, connecting the said bars; means for adjustably securing the said extension within apertures adjacent the ends of said bars, and a pair of traction wheels rotatably mounted upon the said bearing shafts between the said bars of each oscillating frame, each of said traction wheels bearing on its inner side a spur gear, which is in alinement with and enmeshing with a spur gear wheel positioned upon said driving shaft, said last mentioned gear wheel being driven by a spur gear wheel located above the frame of the said vehicle.

In testimony whereof I have signed my name to this specification in the presence of two subscribing witnesses.

HENRY P. HEWETT.

Witnesses:
  L. J. BIRDSEYE,
  L. H. PRATHER.